United States Patent [19]

Trimble et al.

[11] 4,174,377

[45] Nov. 13, 1979

[54] FORMATION OF CYANATE COMPOUNDS

[75] Inventors: Lee E. Trimble, Clark; Rudolf J. H. Voorhoeve, Summit, both of N.J.

[73] Assignee: Bell Telephone Laboratories, Incorporated, Murray Hill, N.J.

[21] Appl. No.: 909,381

[22] Filed: May 25, 1978

[51] Int. Cl.$^2$ .......................... C01C 3/00; C01C 3/14
[52] U.S. Cl. ................................................. 423/365
[58] Field of Search ........................................ 423/365

[56] References Cited

U.S. PATENT DOCUMENTS

| | | | |
|---|---|---|---|
| 1,083,703 | 1/1914 | Rothe | 423/352 |
| 3,425,803 | 2/1969 | Romeo | 423/239 |

OTHER PUBLICATIONS

Mellor, Treatise on Inorganic and Theoretical Chemistry, vol. VIII (1928), p. 161.

Primary Examiner—O. R. Vertiz
Assistant Examiner—Wayne A. Langel
Attorney, Agent, or Firm—Bruce S. Schneider

[57] ABSTRACT

The use of a reaction mixture of carbon monoxide, an oxide of nitrogen such as nitric oxide, and a source of hydrogen when passed over a hydrogenation catalyst produces cyanate compounds, e.g., ammonium cyanate and isocyanic acid. The reaction conditions chosen determine the relative amounts of the various cyanate compounds to be formed. When the formation of ammonium cyanate is desired, the addition of ammonia to the reaction mixture reduces the amount of nitric oxide reactant necessary, while enhancing the efficiency of ammonium cyanate production. When a palladium or iridium catalyst is used, the production of isocyanic acid is favored.

14 Claims, 11 Drawing Figures

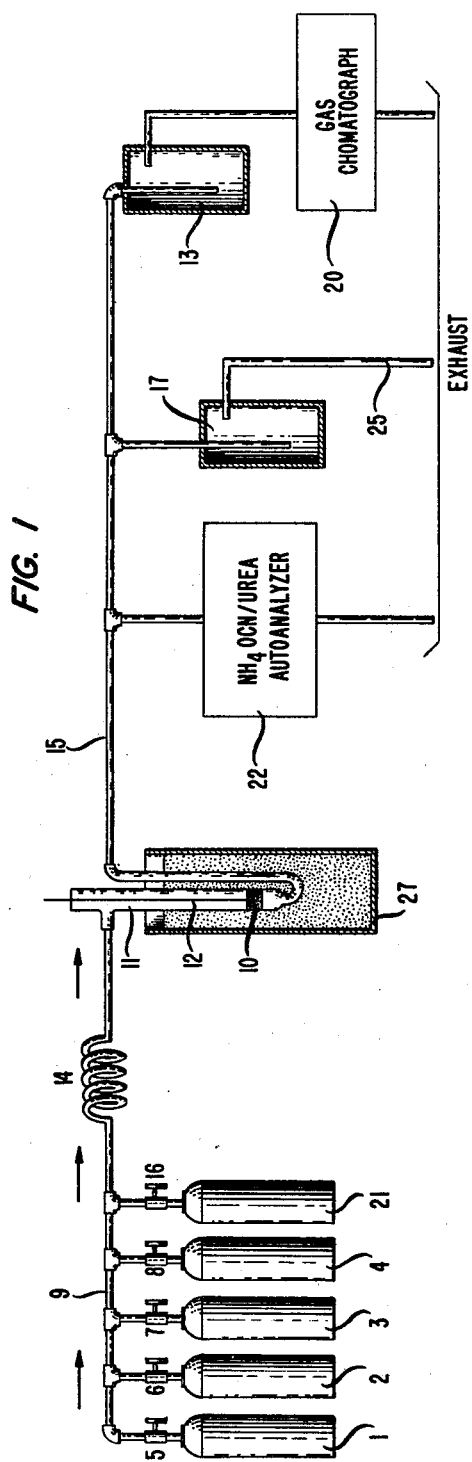

FORMATION OF CYANATE COMPOUNDS

CROSS REFERENCE

This application is related to, and has a common assignee with U.S. application Ser. No. 776,787, filed Mar. 11, 1977.

BACKGROUND OF THE INVENTION

1. Field of the Invention

This invention relates to the synthesis of nitrogen compounds and, more particularly, to the formation of cyanates.

2. Art Background

A number of cyanate compounds (for purposes of this disclosure, a term used generically for compounds having an OCN or NCO moiety such as cyanates or isocyanates) have significant commercial applications. For example, ammonium cyanate or its equivalent urea is employed in a number of large scale uses. Urea is used as a main constituent in fertilizers, as a monomer in the production of plastics, and as an ingredient in animal feed. The large quantities of urea used are synthesized commercially by contacting carbon dioxide and ammonia at high pressure, typically 200 to 400 atms. and at temperatures between 140° to 210 degrees C. to form ammonium carbamate, which is then decomposed into urea and water with a yield of 50%. The high pressures and incomplete conversion of $CO_2$ and $NH_3$ necessitate the use of expensive, sophisticated reaction and separation equipment. Production of smaller quantities is, therefore, not fiscally acceptable.

Other cyanate compounds which are potentially useful for similar applications, e.g., manufacture of monomers for polymer production, are too expensive for large-scale production by presently available techniques. For example, isocyanic acid (HNCO) is typically prepared by the slow or even dropwise addition of an acid to potassium cyanate. Although this process does not present the manufacturing complexities of urea production, i.e., it requires only very simple equipment, it is obviously unsuitable for large scale applications.

Thus, some processes for manufacture of cyanate compounds are suitable for large scale production, but require extensive capital investment in equipment while other processes utilize simple, inexpensive equipment, but are not adaptable for large scale production. Reported attempts to combine the attributes of process simplicity and suitability for large volume production have not been entirely satisfactory.

SUMMARY OF THE INVENTION

Cyanate compounds such as ammonium cyanate ($NH_4OCN$) and HNCO are made by a low pressure, e.g., 1 atm., catalytic process. This process requires the reaction of a nitrogen oxide, i.e., $NO_x$, CO and a source of hydrogen, e.g., $H_2$, in the presence of a hydrogenation catalyst.

The reaction conditions employed, e.g., catalyst and temperature, determine the relative amounts of the cyanate compounds which are formed. For example, if the hydrogenation catalyst chosen is either iridium or palladium, a high conversion efficiency of $NO_x$ into HNCO is obtainable. When $NH_4OCN$ is the desired end product, the amount of nitrogen oxides used as reactants may be reduced, although not entirely eliminated by addition of an equivalent amount of $NH_3$.

BRIEF DESCRIPTION OF THE DRAWINGS

FIG. 1 is a schematic representation of an apparatus suitable for the practice of the invention, and;

FIGS. 2 through 11 are graphs illustrating various reaction conditions suitable for the practice of the invention.

DETAILED DESCRIPTION

Figure 3:
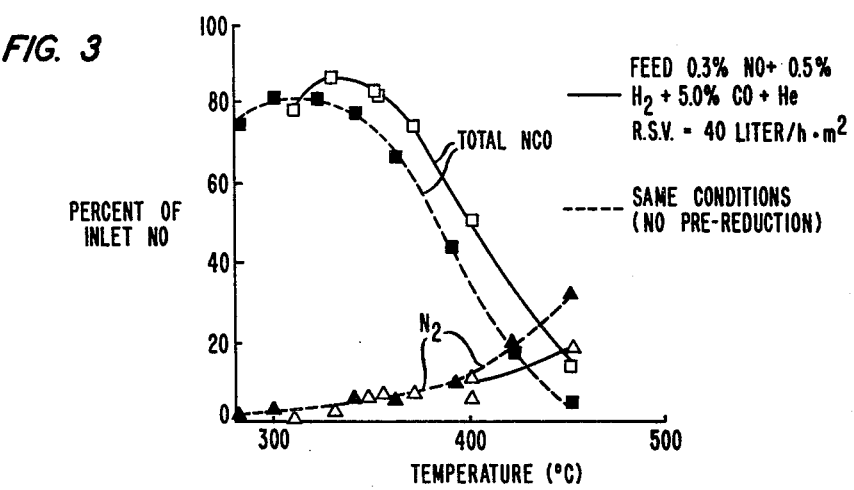

In the context of this description, it is convenient as a pedagogic aid to exemplify the conditions necessary for producing the cyanate compounds, $NH_4OCN$ or HNCO, in terms of a contemplated reaction mechanism. The conditions given, however, are those observed to be appropriate and do not rely on any specific reaction scheme, nor is the mechanism intended to be an atomistic representation of the stepwise reaction process. The mechanism used appears to explain the behavior observed and is convenient for elucidation.

When CO, a nitrogen oxide and a source of hydrogen is combined over a reduced palladium catalyst or over an iridium catalyst, both $NH_4OCN$ and HNCO are produced. The ratio of these two products depends on the particular temperature used. For example, at 350 degrees C., production of HNCO exceeds that of $NH_4OCN$ while at 430 degrees C. the reverse is true. With other hydrogenation catalysts, ammonium cyanate is generally the predominant product. Further, the addition of $NH_3$ to the initial reactants strongly affects the conversion process and increases the relative amount of conversion of NO to $NH_4OCN$, as compared to HNCO.

A mechanism which explains these observations entails the formation of an adsorbed isocyanate (NCO) moiety on the surface of the catalyst. The adsorbed NCO is probably produced by the reaction mechanism,

  (1)

  (2)

The isocyanate radical then can react with a hydrogen atom to form adsorbed HNCO by the equation

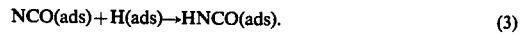  (3)

This reaction product can then desorb to form isocyanic acid.

However, isocyanic acid reacts spontaneously with $NH_3$ through the reaction

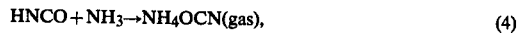  (4)

to form $NH_4OCN$. The $NH_3$ or its precursor $NH_2$, needed to yield $NH_4$ for production of $NH_4OCN$ is formed in situ through the reaction

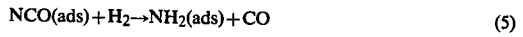  (5)

when molecular hydrogen, for example, is used as a source of hydrogen, or through the reactions

  (6)

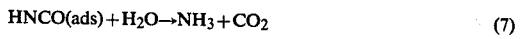  (7)

when water is used as a source of hydrogen. To form $NH_4OCN$, either the NCO(ads) or the HNCO(ads) must have a sufficient residence time on the catalyst to form NH$_3$ which, in turn, reacts with HNCO. The residence time of the adsorbed HNCO and the adsorbed NCO on the catalyst then, in essence, determines the ultimate product to be formed. That is, the in situ production of NH$_3$ is to be avoided or reduced if HNCO is the desired product. If the HNCO and NCO have a residence time which is short compared to its reaction period with other reactants which are present, the product is HNCO.

Additionally, NH$_3$ which may be added to the initial reaction mixture also reacts as shown in equation 4. The addition of NH$_3$ insures the presence of NH$_3$ for reaction with HNCO to produce NH$_4$OCN. In this manner, the need in the production of NH$_4$OCN for partial ammonification of the NCO(ads) or HNCO(ads) through reactions 5, 6, or 7 is obviated and residence time of the HNCO or NCO is not as critical. Again, the in situ production of NH$_3$ or its precursor is diminished since the added NH$_3$ generally reacts with HNCO(ads) before the latter is converted to the ammonia entities, NH$_3$ or NH$_2$(ads).

If NH$_3$ is not added to the reactant mixture, the formation of NH$_3$ depends on the in situ formation of NH$_3$, as represented in reactions such as 5, 6, or 7. Hydrogenation reaction 5, occurs at higher temperatures, e.g., 350° to 450 degrees C.—the particular temperature being determined by the catalyst and flow rate used. (Higher flow rates usually necessitate higher temperatures.) Hydrolysis reactions 6 and 7 typically occur at lower temperatures, e.g., 250° to 350 degrees C. Typically at temperatures below 300 degrees C., NO$_x$ is not fully converted to an adsorbed entity and is present on the catalyst surface. The presence of an oxidizing agent, NO$_x$, together with the temperature dependence of the hydrogenation reaction prevents the hydrogenation of isocyanate moieties (equation 5) to NH$_3$. Since at lower temperatures, the hydrolysis reactions are generally slow, if the HNCO and NCO have a short residence time on a particular catalyst, HNCO is the predominant product. (Palladium and iridium produce such short residence times.) At higher temperatures, the nitric oxides are almost entirely converted to adsorbed isocyanate and the reduction reaction 5, to NH$_3$ is not inhibited. The reduction reaction is a relatively fast one and leads to good yields of NH$_4$OCN. Thus, above the temperature at which, for a particular hydrogenation catalyst, substantially all the NO$_x$ is converted to form OCN(ads), the NH$_4$OCN production increases substantially while below this temperature HNCO dominates for catalysts such as palladium and iridium if NH$_3$ is not added to the reaction mixture. It should be noted, however, tha the ammonia reaction entity, irrespective of source, contributes the NH$_4$+ radical to NH$_4$OCN, but is not utilized in formation of the isocyanate radical. Therefore, when NH$_3$ is added to favor the production of NH$_4$OCN, NH$_3$ to NO$_x$ reactant ratios above one are progressively less efficient and indeed are inoperative if NO$_x$ is not provided.

As has been described in a copending application (Voorhoeve, Ser. No. 776,787, filed Mar. 11, 1977), which is hereby incorporated by reference, urea is formed by reacting a nitrogen oxide, CO, and a source of hydrogen in the presence of a hydrogenation catalyst. Because of the similarity of the reactants, the apparatus described in the copending application is that generally used for the practice of the subject invention.

As shown in FIG. 1, cylinders of the reactant gases 1, 2, 3, and 4 and a cylinder of an inert carrier gas 21, are attached through individual flow controllers 5, 6, 7, 8, and 16 to a manifold 9. The reactant gases are a nitrogen oxide (i.e., NO, or NO$_2$ or combinations of NO and NO$_2$), CO, NH$_3$ and a material which provides a source of hydrogen. (For convenience, nitrogen oxides will be represented by NO$_x$ in the remainder of the specification.) Molecular hydrogen and water are exemplary of the materials suitable as hydrogen sources. In the latter case, since the process involves a gas phase reaction, the water is added by techniques such as passing the reactant gases through a water bubbler. Indeed, if the other reactants have a sufficiently high water impurity content, such as when NO is obtained from air-oxidation of NH$_3$, no further addition is necessary. The particular gas used as the inert carrier is not critical. Typically, in laboratory preparation, helium is used because of its availability and because it facilitates analysis of reaction products. However, other inert gases such as nitrogen are also acceptable.

The catalyst 10 is inserted in a reaction vessel 11, and a thermocouple 12, or other temperature monitoring means is placed near the catalyst. The catalyst used is a hydrogenation catalyst. For example, catalysts containing noble metals such as palladium and iridium are useful when HNCO production is contemplated. When NH$_4$OCN or its isomeric equivalent urea is desired, hydrogenation catalysts such as rhodium, palladium, iridium and platinum or alloys of these metals with each other or with Cu, Ag, and Au, and Cu-Ni alloys are useful. The physical form of the catalyst is not critical. Convenient forms such as small metal particles or a supported catalyst are suitable. The yield of urea or urea equivalent, i.e., NH$_4$OCN, or the yield of HNCO depends on the reaction conditions and the particular catalyst used. Oxidic supports such as alumina are not favored since yields are depressed by excessive NH$_3$ formation. It is desirable for many uses to select the conditions and the catalyst to yield conversion efficiencies of NO$_x$ to the desired end product of greater than 30%, e.g., 40, 50 or 60%. Preferably, when the reactants are not obtained as by-products from other operations, conversion efficiencies greater than 70% are advantageous.

After the reactants and catalysts are positioned, the apparatus is sealed, and the entire system is purged with the inert gas. Then, if desired, the catalyst is reduced by running H$_2$ over the catalyst while it is heated to between 300° and 600 degrees C., preferably between 375° and 500 degrees C. for between 1 to 18 hours. For production of HNCO with a palladium catalyst, this treatment step is important if conversion efficiencies of NO to HNCO above 30% are desired. When iridium is used to produce HNCO, reduction is not as important if conversion efficiencies below 60% are acceptable, but does increase obtainable conversion efficiencies. For hydrogenation catalysts, in general, when used in the production of NH$_4$OCN, yields are increased through reduction of the catalyst, and are helpful in producing conversion efficiencies of NO to NH$_4$OCN above 50%. An expedient method of reducing the catalyst is by introducing H$_2$ into the system, either in pure form or diluted with an inert gas in a ratio of inert gas to H$_2$ of, for example, between 0 and 50. This reduction aids in the formation of HNCO over palladium or iridium by eliminating surface oxides which inhibit the formation of adsorbed HNCO through reaction 3. The formation of NH$_4$OCN is increased for many reactant proportions by producing conditions conducive to reduction reaction 5.

To start the reaction process, the reactants and an inert gas are bled through their respective flow controllers into the manifold 9, and are directed through mixing coil 14, to insure homogeneity. For the production of HNCO, the reactants used are $NO_x$, CO, and a hydrogen source, e.g., $H_2$ or water. These reactants are used either with iridium, palladium, or a catalyst containing one of these elements. To produce $NH_4OCN$, the reactants are $NO_x$, CO, $NH_3$ and a hydrogen source. Initially $NO_x$ and CO are fed through the apparatus to insure production of NCO on the catalyst. The $NH_3$ and source of hydrogen is then added after a short interval, e.g., 10 to 60 minutes.

The concentration of the reactants in the gas flow depends on the ultimate product desired. For $NH_4OCN$ production, $NO_x$ partial pressures of 0.001 to 0.2 atms., (measured at room temperature) preferably 0.003 to 0.1 atms., a $CO/NO_x$ ratio of between 0.5 and 20, preferably between 2.0 and 5.0, a $H_2/NO_x$ ratio between 0.1 and 3.0, preferably between 0.25 and 2.0, and a $NH_3/NO_x$ ratio of between 0.01 and 5.0, preferably between 0.5 and 1.5 are typically used. If sources of hydrogen other than $H_2$ are utilized, the amount of these alternative sources should be commensurate with the ranges of $H_2$ indicated above. For example, $H_2O$ is a source of $H_2$ through the water gas shift reaction.

$$(CO + H_2O \rightleftharpoons CO_2 + H_2). \tag{8}$$

Therefore, appropriate ranges for $H_2O$ in the reaction mixture, considering the equilibrium constant of the water gas shift reaction, are ratios of $H_2O/NO_x$ in the range of between 0.1 and 15 preferably between 0.5 and 5. Although various $NH_3$ to $NO_x$ ratios are effective in producing $NH_4OCN$, a cost efficient composition is approximately a 50/50 mixture. As discussed earlier, the $NO_x$ reactant is incorporated directly in the cyanate moiety whereas the $NH_3$ is incorporated into the ammonium moiety. Therefore, since $NH_4OCN$ has a 1:1 mole ratio of ammonium to NCO radicals, about a 50:50 ratio of reactant gases produces the least unreacted starting material.

When the production of HNCO is desired, exemplary reactant concentrations in the gas flow are an $NO_x$ partial pressure of 0.001 to 0.2 atms., (measured at room temperature) preferably 0.003 to 0.1 atms., a $CO/NO_x$ ratio of between 1.0 and 20, preferably between 2.0 and 5.0 and an $H_2/NO_x$ ratio of between 0.1 and 3.0, preferably between 0.25 and 2.0. As with the production of $NH_4OCN$ different sources of hydrogen require addition to the reaction mixture commensurate with the appropriate amount of hydrogen. For example, when $H_2O$ is used as the source of hydrogen, suitable ratios of $H_2O$ to $NO_x$ are in the range 0.1 and 20 preferably between 0.25 and 15. The remainder of the reactant gas flow chosen to produce $NH_4OCN$ or HNCO is generally composed of inert gases, i.e., gases which do not interfere with the desired reaction sequence. However, certain additives, when temporarily added to the reactant mixture improve yields under appropriate conditions. For example, addition of $SO_2$ in concentrations of 5 to 10,000 parts per billion for periods of 5–10 minutes improves HNCO yields. This is probably because the $SO_2$ partially eliminates hydrogenation sites which are prone to hydrogenation of NCO to $NH_3$ rather than to HNCO.

Suitable pressures for the total gas flow are between about 0.1 and 10 atms., preferably between 0.5 and 2 atms. Within these limitations of reactant concentrations, total gas flow, and pressure, situations are encompassed where no inert gas is used, and the system operates at a partial vacuum. Such operations are within the ambit of the invention. However, it is generally most convenient to work at pressures in the range of 1 atm. which usually necessitate the addition of some inert gas. It is noted that for $NO_x$ produced from direct combinations of air or by air oxidation of $NH_3$, an inert $N_2$ diluent is already present in the feed gases.

The gas mixture is passed over the heated catalyst. The temperature of the catalyst is chosen to favor the desired end product. For $NH_4OCN$ produced from reactant mixtures which include $NH_3$, temperatures in the range between 200° and 600 degrees C., preferably between 300° and 400 degrees C. are generally useful for most hydrogenation catalysts and for flow rates in the range generally used. For the production of HNCO over iridium or palladium, reaction temperatures in the range between 200° and 450 degrees C., preferably between 250° and 375 degrees C. are generally the most efficient. As discussed earlier, lower temperatures favor HNCO production because of the effect of unconverted $NO_x$. The exact temperature used depends on the other conditions. For example, higher flow rates usually require higher temperatures to produce the same yield of cyanate compounds. A control sample is used to determine the best combination of specific conditions.

The gas flow rate generally has an effect on the percentage of $NH_4OCN$ or HNCO produced. Faster flow rates and concomitant presence of at least traces of unconverted $NO_x$ throughout the catalyst mass generally favor the production of HNCO. Typically, for most catalysts, flow rates between 1.0 and 1,000 l/h per $m^2$ are acceptable for $NH_4OCN$ production while flow rates between 10 and 1,000 l/h per $m^2$ are suitable for HNCO manufacture. (The $m^2$ refers to the total surface area of the catalyst accessible to the reactant gas flow.) The reacted gas passes out of the reactor into tube 15. The desired product in this effluent, i.e., urea, $NH_4OCN$ or HNCO is then removed either by condensing out and collecting for further use, or by reaction with another entity to produce a different product. (Note for purpose of this disclosure urea to which ammonium cyanate isomerizes is also considered a cyanate compound.) For collection, the condensation temperature is chosen to separate the product which is desired. To separate $NH_4OCN$ or urea, the gas flow is passed through a trap 17, which is kept at a temperature between 0° and 120 degrees C. At temperatures below 60 degrees C. the solid product obtained is $NH_4OCN$. However, at temperatures between 60 degrees C. and 120 degrees C., $NH_4OCN$ converts spontaneously to urea. Urea decomposes in the solid state at temperatures above 120 degrees C. Condensation above this temperature is therefore not recommended. If HNCO is the desired product, its condensation is performed at temperatures between −50° and −20 degrees C. In either case, after condensation in trap 17, the remaining gases are then vented through tube 25.

Originally in the early stages of investigation, experiments were run with large excesses of CO. To insure that later results could be compared with these earlier experiments, many experiments use this excess of CO. Although good conversion to the cyanate end product are obtained, CO is wasted. Therefore, the preferred ranges previously given are chosen so that the more economical use of CO is maintained. Reduction of CO to stoichiometric amounts does not appreciably affect yields.

EXAMPLE 1

The apparatus shown in FIG. 1 including, for the purpose of analysis, a gas chromatograph 20, to measure the concentration of $NO_x$ and $N_2$ in the exhaust gas and a modified Technicon Colorimetric Auto-Analyzer 22, (an apparatus which functions spectroscopically to determine chemical concentrations) to measure the concentration of cyanate, was used. The modification of the analyzer was necessary to prevent clogging of the apparatus with urea or $NH_4OCN$. The modification consisted of installing an absorber which forced the hot gases (withdrawn from the catalytic reactor) through a silver nozzle followed by condensation and dissolution of the cyanate component on a surface which is continually flushed with an alcoholic solution. The solution contained excess $NH_3$ to completely convert all HNCO present to $NH_4OCN$. The solution was heated to between 60° and 90 degrees C. to effect total conversion of cyanate to urea. The urea solution was then analyzed using the carbamido-diacetyl reaction. (See *J. Biochemistry*, 33, 902 (1939).) The amount of HNCO present was determined by determining the amount of $NH_3$ in the effluent and comparing to the amount of $NO_x$ converted.

Approximately 0.6 grams of Pt-10% Rh gauze (wire mesh 100μ wires) with an active surface of approximately 6.0 $m^2/gm$ (area available for contact with the reactants) was put into the reaction vessel. A gas mixture of 1% NO, 1% $NH_3$, 2% CO, 0.5% $H_2$ and the remainder He (total reactant gas pressure of 1 atm.) was flowed at 19 l/hr per $m^2$ over the catalyst. Initially, only the He, CO, and NO were flowed for 35 min. over the catalyst heated to 320 degrees C. Then the $NH_3$ and $H_2$ were added. A sample of the reactor effluent was dried and $CO_2$ was removed with an ascarite trap 13. Exhaust from the trap was analyzed on a gas chromatograph for components such as NO and $N_2$. (Ammonia in the effluent was calculated by comparing the amount of NO reacted with the measured amount of all other nitrogen containing entities produced.) Another sample of effluent was analyzed in the auto-analyzer 22 for NCO. Measurements of total NCO production for various temperatures between 300° and 400 degrees C. were made. (The catalyst was heated by a fluidized sandbed with a heating coil 27.) The results are shown graphically in the solid outline of FIG. 2. It should be noted that for these particular conditions the NCO production is essentially constant in the measured temperature range.

EXAMPLE 2

The same conditions used in Example 1 were repeated except the flow rate of the reactants used was 9.6 l/hr. per $m^2$. The results obtained are shown in FIG. 2 by the dotted graphs. A much stronger temperature dependence for this flow rate is observed. It should be noted that higher flow rates shift the NCO production maximum to higher temperatures. (Three points were taken where the initial $NO_x$/CO flow without $NH_3$ or $H_2$ was for 45 min. at 363 degrees C.)

EXAMPLE 3

A mixture of NO, CO, $NH_3$ and a source of $H_2$, either $H_2$ or $H_2O$, was reacted by the procedure described in Example 1. For each experiment, a reactant composition having a 1 atm. pressure of 0.3% $NH_3$, 0.3% NO and 5% CO and the remainder He was flowed over a Pt-10% Rh catalyst. Initially $NO_x$/CO was flowed without $NH_3$ or a source of hydrogen for 45 min. at 271 degrees C. and 25 min. at 304 degrees C. Various runs were made using different temperatures, flow rates, and ratios of $H_2$ to $H_2O$. The specific conditions used are shown in the following table.

|   | Temp. C. | Flowrate $l/m^2 \cdot hr$ | Inlet gas* % $H_2$ | % $H_2O$ | Conversion of NO to % $N_2$ | % NCO |
|---|---|---|---|---|---|---|
| A | 340 | 8.0 | 0.15 | 0 | 10.5 | 84 |
| B | 340 | 8.0 | 0.30 | 0 | 4.5 | 74.5 |
| C | 350 | 8.0 | 0.15 | 0 | 14 | 86 |
| D | 350 | 11 | 0 | 0.15 | 30 | 69.5 |
| E | 350 | 11 | 0 | 0.35 | 31 | 66 |
| F | 350 | 11 | 0 | 0.5 | 29 | 65 |
| G | 350 | 11 | 0 | 0.6 | 25.5 | 58 |

The results indicated by lines A and C of the table are for a stoichiometric ratio of NO, $NH_3$ and $H_2$ with an eightfold excess of CO. An increase of $H_2$ (line B) or a substitution of a portion of the $H_2$ with $H_2O$ (line D) slightly degrades the ultimate yield of NCO. However, the results denoted by lines D through G indicate that a useful conversion of NO to NCO is obtainable with complete or partial replacement of $H_2O$ for $H_2$.

EXAMPLE 4

Figure 4:
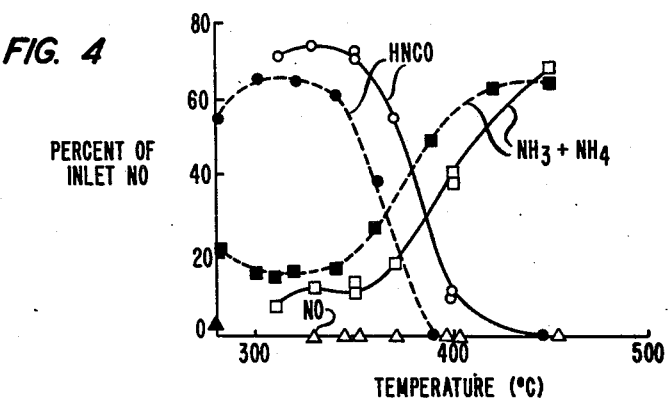

The same apparatus was used as described in Example 1, except 1.04 grams of Ir was used as a catalyst instead of the Pt-Rh alloy of that example. After inserting the Ir in the reaction section in the form of a powder sponge, the catalyst was reduced with an 80% $H_2$ in He mixture at 450 degrees C. for 100 minutes. The gas flow used to reduce the catalyst was then replaced by 1 atm. of a mixture having 0.3% NO, 0.5% $H_2$, 5% CO and the remainder He. As before, entities such as NO and $N_2$ were monitored on a gas chromatograph and the auto-analyzer was used to monitor isocyanate content of the effluent. Measurements were taken at a flow rate of 40 l/hr per $m^2$ in a temperature range between 280° and 450 degrees C. As shown in the graph of FIGS. 3, and 4 (the figures being separated for ease of comprehension) good yields of isocyanic acid were obtainable. Additionally, results without the prereduction are also shown.

EXAMPLE 5

Figure 5:
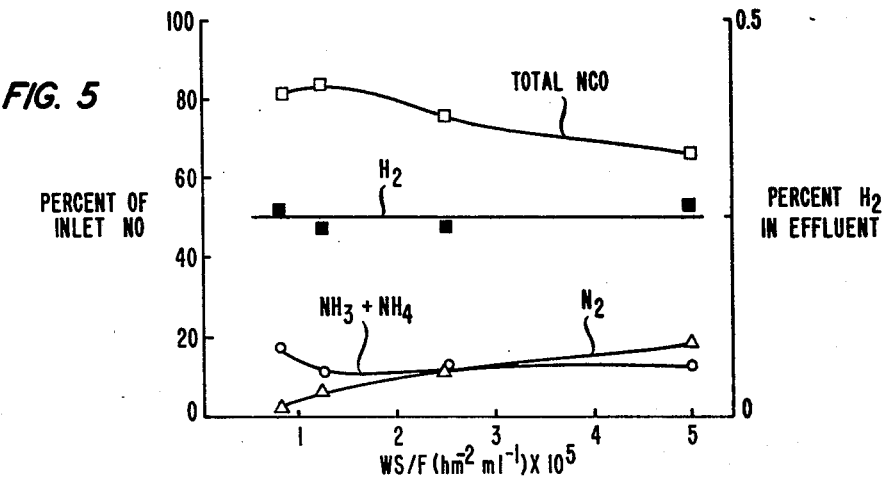

Approximately 1.04 grams of an Ir sample were inserted in the reaction chamber in the form of a powder sponge. The catalyst was reduced in an 80:20 $H_2$/He mixture for 100 min. at 450 degrees C. The reduction was then stopped and 1 atm. of a reaction mixture containing 0.3% NO, 0.5% $H_2$, 5% CO and the remainder He was flowed at various rates over the catalyst whose temperature was reduced to approximately 362 degrees C. As before a gas chromatograph was used to monitor $N_2$, $H_2$, and NO in the effluent and the auto-analyzer was used to measure total cyanate production. The results are shown graphically in FIG. 5. As can be seen, the flow rate had a significant but not unduly large effect on the isocyanic acid production.

EXAMPLE 6

Figure 6:
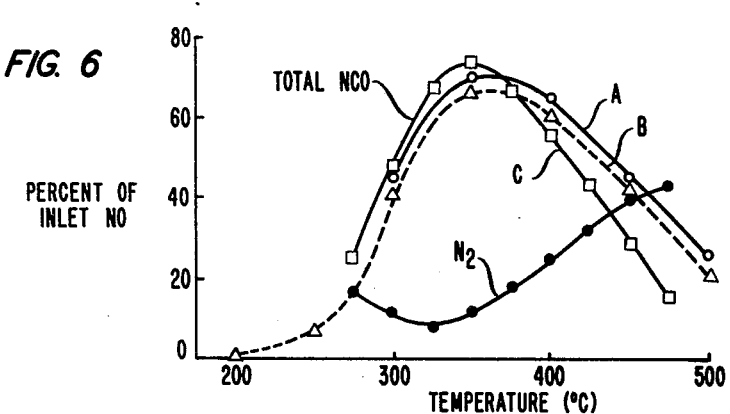
Figure 7:
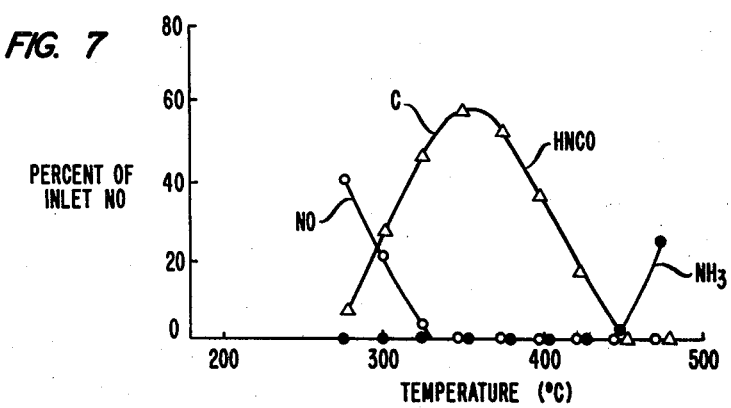

The same apparatus as described in Example 1 was used. Approximately 1.5 grams of a Pd catalyst was inserted in the reaction area in the form of a powder sponge. The catalyst was then treated in one of three ways: (1) Pure $H_2$ was flowed over the catalyst heated to 450 degrees C. for two hours, (2) Pure He was flowed over the catalyst for 16 hours at room temperature, or (3) The catalyst was extensively reduced for 18 hours at 500 degrees C. with 75% $H_2$ in He. After one of the preceding treatments was performed, a gas mixture comprising 0.3% NO, 0.5% $H_2$, and 5% CO with sufficient He to produce a 1 atm. pressure was flowed at 40 l/hr. per $m^2$ over the Pd sample. Entities such as NO and $N_2$ were monitored on the gas chromatograph and total cyanate was measured on the auto-analyzer at a variety of temperatures between 200° and 500 degrees C. The results obtained are shown in FIGS. 6 and 7. (Two separate graphs were made as a matter of convenience.) Solid line A corresponds to treatment 1, line B to treatment 2, and solid line C to treatment 3. As can be seen, for useful reaction conditions, the third treatment, i.e., complete reduction, produces the best yields of NCO and, particularly, of isocyanic acid.

EXAMPLE 7

Approximately 1.5 grams of a Pd catalyst was inserted in the reaction chamber and reduced by $H_2$ at 450 degrees C. for 2 hours. A reaction mixture having a pressure of 1 atm. and containing 0.3% NO, 5% CO, and various amounts of either $H_2$ or $H_2O$ and the remainder He was flowed at 40 l/hr per $m^2$ over the catalyst which was heated to 350 degrees C. Various combinations of $H_2$ and $H_2O$ were inserted in the reactant flow, and the conversion efficiencies obtained are shown in the following table.

| | Temp. C. | Flow-rate l/m². hr | Inlet gas % $H_2$ | % $H_2O$ | Yield % $N_2$ | % NCO | Percent Conversion of NO |
|---|---|---|---|---|---|---|---|
| A | 350 | 40 | 0.5 | 0 | 11.5 | 72.5 | 100 |
| B | 350 | 40 | 0.5 | 3.4 | 10 | 75.5 | 100 |
| C | 350 | 35 | 0 | 3.4 | 39 | 38 | 87 |
| D | 350 | 35 | 0 | 0.2 | 34 | 20 | 80 |
| E | 350 | 35 | 0.2 | 0.2 | 22 | 54.5 | 94.5 |
| F | 500 | 40 | 0.5 | 0 | NM* | 21 | 100 |
| G | 500 | 40 | 1.0 | 0 | NM* | 1.5 | 100 |

Figure 8:
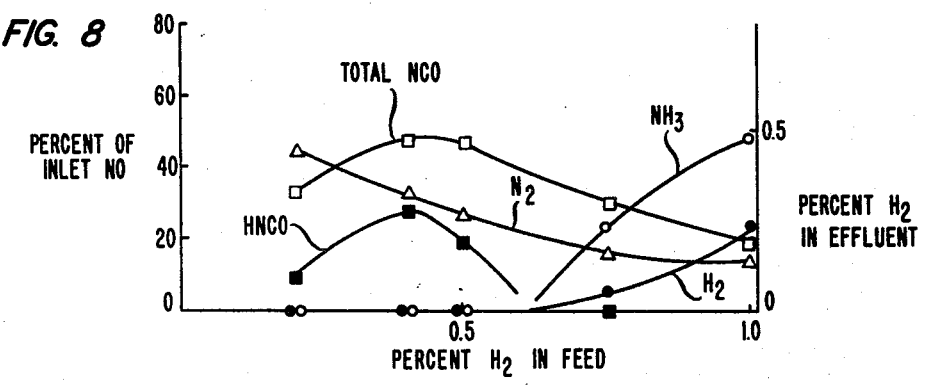
Figure 9:
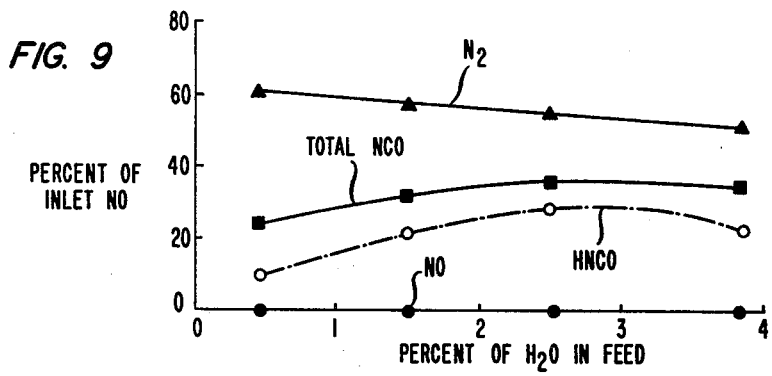

*NM = not measured (It should be noted that the flow rate between examples varies slightly, but this slight variation is insufficient to cause a significant change in results. Additionally, two data runs were taken at 500 degrees C. to indicate the temperature dependence.) The data represented by lines A and B show that, at 350 degrees C., addition of a large excess of $H_2O$ does not affect the NCO production appreciably. The data of lines C, D and E show that, for this particular temperature, efficiencies were somewhat reduced by a large-scale replacement of $H_2$ with $H_2O$. Further, the use of higher temperatures, i.e., 500 degrees C., also degrades the ultimate yield at the flow rate employed here. For comparison, a similar experiment was done under the same conditions, but at 425 degrees C. using 0.87 grams of the catalyst. The results are shown in FIGS. 8 and 9.

EXAMPLE 8

Figure 10:
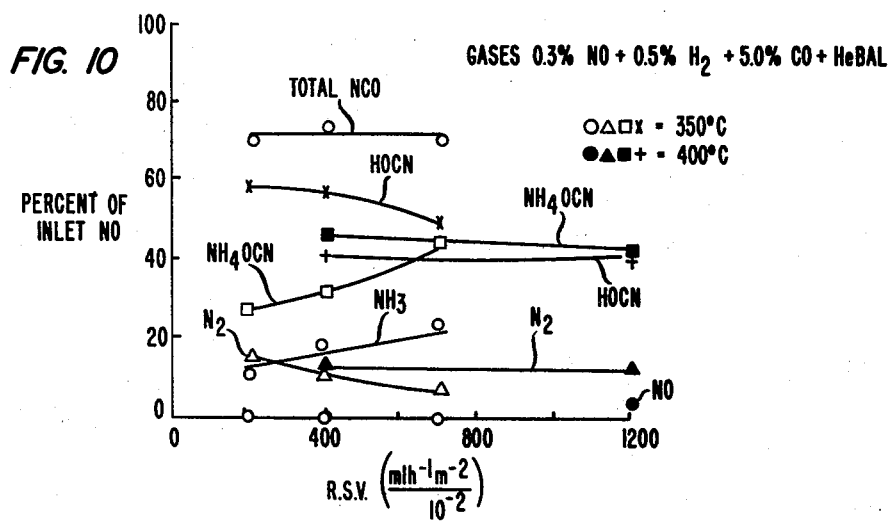

Approximately 1.5 grams of Pd were inserted in the reaction chamber and reduced by the same method used in Example 7. After this treatment, 1 atm. of a reaction composition of 0.3% NO+0.5% $H_2$+5.0% CO and the balance He was flowed at various rates over the catalyst which was heated either to 350° or 400 degrees C. The results obtained by measurements on gas chromatograph and auto-analyzer are shown in FIG. 10.

EXAMPLE 9

Figure 11:
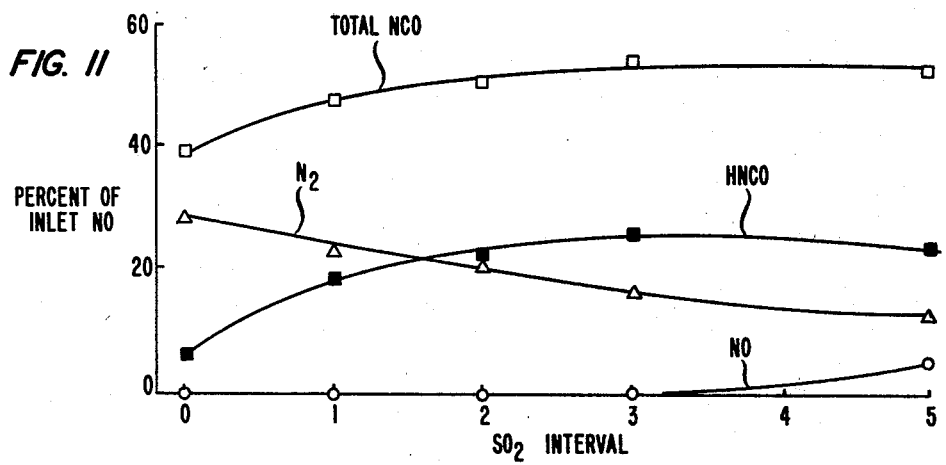

The apparatus, as described in Example 1, was used by inserting 1.5 grams of a Pd catalyst having a surface area of approximately 0.4 $m^2$/gm. After the catalyst was inserted in the reaction area, it was reduced in pure hydrogen for two hours at 450 degrees C. The hydrogen flow was terminated, and at the same temperature 1 atm. of a reaction mixture containing 0.3% NO, 0.5% $H_2$, 5.0% CO and the remainder He was flowed at a rate of 40 l/hr.$m^2$ over the catalyst. Sulfur dioxide was introduced in doses of 5 minutes each at a concentration of 5 parts per million of the gas flow. Measurements after each one of these $SO_2$ intervals were taken after the $SO_2$ was purged from the gas flow. The results as shown in FIG. 11 indicate that small quantities of $SO_2$ are usable for increasing the yield of isocyanic acid.

We claim:

1. A process for producing isocyanic acid comprising the steps of (1) contacting a hydrogenation catalyst with a reaction mixture comprising a nitrogen oxide, CO, and a source of hydrogen under reaction conditions which avoid the substantial formation of collectible ammonia from said reaction mixture and (2) removing said isocyanic acid from the reactant flow.

2. The process of claim 1 wherein said reaction condition is the use of said hydrogenation catalyst containing a noble metal chosen from the group consisting of palladium and iridium, and wherein said cyanate compound is isocyanic acid.

3. The process of claim 2 wherein said hydrogenation catalyst is maintained at a temperature in the range 200 to 450 degrees C.

4. The process of claim 3 wherein said hydrogenation catalyst is maintained in the range 250 to 375 degrees C.

5. The process of claim 2 wherein said source of hydrogen is chosen from the group consisting of $H_2$ and $H_2O$.

6. The process of claim 2 wherein said hydrogenation catalyst is reduced before contacting said reaction mixture.

7. The process of claim 2 wherein the flow rate of said reactant mixture is in the range 10 to 1000 l/hr. per $m^2$.

8. The process of claim 2 wherein $SO_2$ is periodically added to said reaction mixture.

9. A process for producing ammonium cyanate comprising the steps of (1) contacting a hydrogenation catalyst with a reaction mixture comprising a nitrogen oxide, CO, a source of hydrogen, and ammonia under reaction conditions which avoid the substantial in situ formation of ammonia entities from said reaction mixture and (2) removing said ammonium cyanate from the reactant flow.

10. The process of claim 1 wherein the ratio of said added $NH_3$ to said nitrogen oxide in said reaction mixture is in the range of 0.01 to 5.0.

11. The process of claim 10 wherein said NH$_3$ to NO$_x$ ratio is in the range 0.5 to 1.5.

12. The process of claim 1 wherein said hydrogenation catalyst is maintained at a temperature in the range 200 to 600 degrees C.

13. The process of claim 1 wherein said hydrogenation catalyst is maintained at a temperature in the range 300 to 400 degrees C.

14. The process of claim 1 wherein said hydrogenation catalyst contains a catalyst chosen from the group consisting of (1) platinum, (2) palladium, (3) rhodium, (4) iridium, (5) the alloys of platinum, palladium, iridium and rhodium with each other and with metals chosen from the group consisting of Cu, Ag, and Au, and (6) Cu-Ni alloys.

* * * * *

UNITED STATES PATENT AND TRADEMARK OFFICE
CERTIFICATE OF CORRECTION

PATENT NO. : 4,174,377
DATED : November 13, 1979
INVENTOR(S) : Lee E. Trimble and Rudolf J. H. Voorhoeve It is certified that error appears in the above-identified patent and that said Letters Patent are hereby corrected as shown below:

Column 3, line 52, "tha" should read --that--. Column 3, line 53, "$NH_4+$" should read --$NH_4^+$--. Column 10, line 66, "claim 1" should read --claim 9--. Column 11, line 3, "claim 1" should read --claim 9--. Column 11, line 9, "claim 1" should read --claim 9--.

Signed and Sealed this

Eighteenth Day of March 1980

[SEAL]

Attest:

SIDNEY A. DIAMOND

Attesting Officer

Commissioner of Patents and Trademarks